Jan. 1, 1952   F. G. GUNN   2,580,422
SYSTEM OF COMPOSITE PHOTOGRAPHY
Filed Aug. 19, 1947   9 Sheets-Sheet 1

Inventor
Frank George Gunn
by Roberts, Cushman & Grover
attys.

Fig.3

Jan. 1, 1952     F. G. GUNN     2,580,422
SYSTEM OF COMPOSITE PHOTOGRAPHY

Filed Aug. 19, 1947     9 Sheets-Sheet 4

Inventor
Frank George Gunn
by Roberts, Cushman & Grover
Attys.

Jan. 1, 1952   F. G. GUNN   2,580,422
SYSTEM OF COMPOSITE PHOTOGRAPHY
Filed Aug. 19, 1947   9 Sheets-Sheet 7

Patented Jan. 1, 1952

2,580,422

UNITED STATES PATENT OFFICE 2,580,422

SYSTEM OF COMPOSITE PHOTOGRAPHY

Frank George Gunn, Ickenham, England, assignor to Technicolor Motion Picture Corporation, Los Angeles, Calif., a corporation of Maine Application August 19, 1947, Serial No. 769,402
In Great Britain September 8, 1941

Section 1, Public Law 690, August 8, 1946
Patent expires September 8, 1961

56 Claims. (Cl. 88—16)

In making photographic pictures, it is often desirable to combine two or more scenes which are photographed at different times or places, into one composite scene. This is especially advantageous in the field of motion picture photography, for reasons of economy and of creating illusions of action in settings which are fanciful or inaccessible.

For example, in order to combine separately taken background and foreground scenes, a silhouette picture of the foreground scene usually termed moving or traveling mask, is printed with the background and foreground negatives to produce the composite picture.

As pointed out in my copending application Serial No. 455,805, filed August 22, 1942 (abandoned), of which this is in part a continuation, the composite photographs made with masks according to previously proposed methods have various deficiencies such as geometrical distortion of the records, loss of definition of the record outlines, lack of registration between the picture components, and lack of uniform effective density.

It is one of the main objects of the present invention to provide an improved method of and apparatus for making composite motion picture film with the aid of traveling masks permitting the manufacture of composite films which are practically perfect so far as matching of the component records, loss of definition of their outlines, and effects of mask density are concerned. Other objects are to provide an improved system of composite photography which is suitable for making composite photographs, especially also motion picture film, with either ordinary or color film material of practically any suitable type; to provide a technique which either avoids such low density fringes altogether or which, as applied to color photography, produces only white fringes and not fringes of objectionable colors as in previously known processes, white fringes being less and very often not at all objectionable.

It has been proposed to provide traveling masks by combining records taken on separately shuttered film material; this technique is generally speaking most satisfactory but as heretofore practiced had the disadvantage of poor register between the separately taken records due to time parallax. Additional objects are to provide separate motion picture records without time parallax therebetween but, due to differences in density characteristics, suitable for making therefrom traveling masks, to permit observation by actors and directing personnel of the background scene while taking mask records against a plain or non-scenic background, to provide an improved system for viewing a foreground scene alone, but particularly also in association with a projected background scene, regardless of intermittent illumination of one of the components to provide improved view finding apparatus associated with camera and illuminating devices, and to provide apparatus for intermittently illuminating part of a scene, particularly the plain backing of a foreground scene, with the aid of daylight.

Additional objects of the invention are to provide a method of making a photographic record with conventional density gradation of a component scene and a record of the same scene which is particularly suitable for producing silhouette masks essentially without parallax between the respective records; to provide apparatus which is particularly suitable for that purpose; and generally to provide a system of composite motion picture photography which permits the manufacture of traveling masks which are essentially perfect for the purpose intended with comparatively simple apparatus, a minimum of exposures and photographic printing and processing steps, which system is applicable to black and white photography as well as to all commercially practical types of color photography, which employs comparatively simple apparatus easily incorporated into conventional color cameras, which permits illumination of the component scenes in efficient and comparatively inexpensive manner with conventional illuminating apparatus or with daylight illuminating apparatus according to the invention, and which permits taking of component scenes in a manner which, with a reasonable degree of truthfulness, simulates to actors, supervisors and camera crews the complete scene of the final composite film.

In one of the principal aspects of the invention there are made for the purpose of obtaining masks for preparing composite photographs, two or more photographic records during a period of photographic analysis, which records have different photographic characteristics as a result of varying during this period the illumination of a part of the photographed field, such as a backing or a foreground scene or of both parts, and of separately photographing these variations.

Apparatus for carrying out the method of making silhouettes in accordance with this invention is characterized in that means are provided whereby the light passing through the camera optical system is caused to fall at intervals on separate films in order to produce separate pictures during the period of analysis having different latent record characteristics.

As already indicated, the system according to the invention is particularly valuable for making color motion pictures.

In one of its aspects, as applied to photography in natural colors, it permits exposure of three separate color aspect negatives, one of which is used for producing a mask. This modification of the invention is advantageous in many instances because it provides initially separate color aspect records, but it produces colored fringes due to illumination of the edges of the foreground by light reflected from the backing. If color separation records are made in the respective apertures, they will not all receive the reflected backing illumination or rim light from the edges of the object in the foreground. If for example the red and blue recording film are in the aperture which is open throughout an exposure interval whereas the green recording film is in the aperture which is shuttered while the backing is flashed, the red and blue recording films do, and the green recording film does not receive the rim light. Therefore, when the composite color film is prepared the foreground objects will appear to be surrounded by a colored rim, in the above example colored magenta, which is sometimes felt to be objectionable.

If, according to another aspect of the invention, all color aspect records are exposed in a single gate, whereas the other gate is used only for a mask record, then the rim will be white, which is less objectionable.

If, according to yet another aspect, the color aspects are recorded in the gate whose shutter is closed when the backing is illuminated then there will be no rim of light at all around portions of the records.

These and other objects, aspects and features will appear from the following description of several typical practical embodiments illustrating the novel characteristics of my invention. This description refers to drawings in which.

In the following description the term "foreground" will be used to describe actors and objects forming their adjacent setting. The term "background" will be used to designate that part of the composite picture which is added to the foreground as above defined to complete the scene, regardless of whether it appears to be in front of, in line with, or behind the foreground relatively to the position of the camera. The terms "backing" or "dummy background" are used to designate a plain surface or a number of plain surfaces of suitable color or tone and made of any suitable material, for example a translucent screen or a canvas sheet or a flat wall. This backing may occupy any desired position in relation to the foreground and is not necessarily behind the foreground as viewed from the camera. The term "record" is herein used to designate a photographically obtained picture of a component or composite scene or a mask delineating a component scene. The term "image" will herein be used to designate the true or virtually visible delineation of a scene as obtained through an optical system, whether or not recorded on photographic emulsion. The record of such an image in photographic material prior to development will be termed "latent record." Under "color aspect" is understood a spectral component, suitable for color photography, of the radiation emitted from a scene or backing, or the hue contents in terms of that spectral component, of a black and white or colored photographic record; in three color photography "blue," "green" and "red" are the conventional color aspects which in subtractive reproduction are rendered in the complementary hues minus blue (yellow), minus green (magenta) and minus red (cyan). The term "frame" is used to designate one of the series of photographic records on a cinematographic film, obtained by exposure during the entire or part of a period of photographic analysis. "Background part" and "foreground part" are the areas of the object field as seen by the camera, occupied by background scene or backing, and foreground scene respectively. "Background portion" and "foreground portion" are the areas of a film frame which record or are designated to record the respective background and foreground scenes. A "silhouette mask" is the practically opaque record of a foreground scene against a clear background portion; a "complementary mask" has a clear foreground portion of an opaque background portion.

Figure 1:
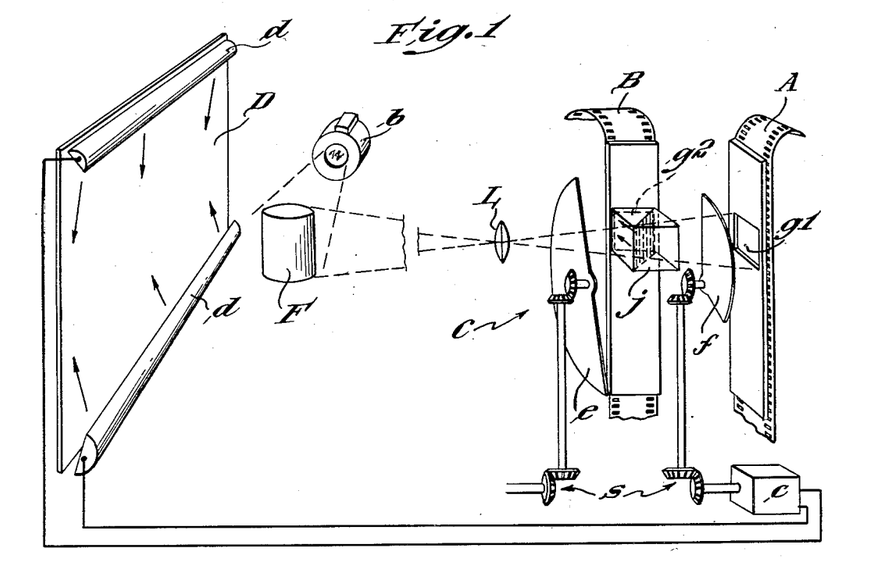
Fig. 1 is a diagrammatic view of apparatus for carrying out the method according to the invention in its broad aspect, namely the making of registering pictures such as film frames having different photographic characteristics of background and foreground portions respectively, regardless whether they are simple black and white records, or color aspect records.

Fig. 1 shows the foreground scene as an object marked F, illuminated by a suitable lamp system b. The backing or dummy background D may be an opaque screen which is illuminated by two flashing lamps d, d.

The camera, so far as essential to the present invention, is shown at C and comprises a lens system L, a beam splitter j, and two film gates g1, g2, containing films A, B. e is a shutter for normal cinematographic analysis and f is another shutter working in synchronism with the shutter e and with the flash lamps d, d. Shutter f obscures film gate g1 during changes in illumination, for example when lamps d flash the backing D with light.

In this example, during the period of photographic analysis, the light passing through the optical system L is made to fall on the two films A, B in gates g1, g2 by means of the action of beam splitter j.

The light passing through the optical system L, j falls on film B for the whole period of analysis but on the other film A for only a fraction of that period. During the period that the film A is obscured, the background D is illuminated in order to produce a photographic record which has opposite latent record characteristics in the portion representing the background as replaced by the backing D, and this is effected by flashing of lights d, d as controlled with flashing control equipment c of conventional design, and kept in synchronism with the shutters e, f, by means of a synchronous drive s. By means of this equipment, two series of latent photographic records representing the foreground scene F may be obtained which, if both are developed as positives or both as negatives will have background portions opposite in density characteristics to each other.

Figure 2:
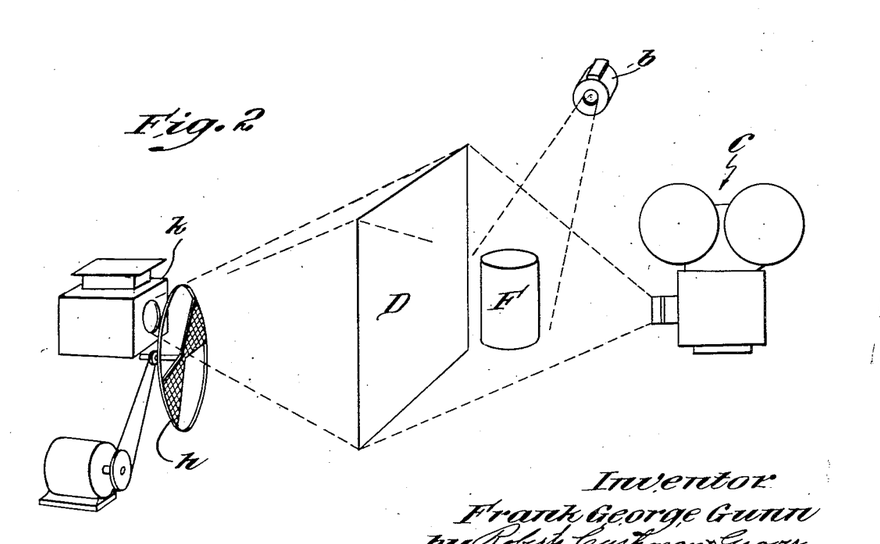
Fig. 2 is a similar view of an alternative arrangement of lighting.

In Fig. 2, the foreground object F is placed in front of a dummy background or backing D which is translucent and illuminated from behind by a lamp k fitted with an occulting shutter h synchronized with the camera C. The optical system of the camera is the same as described with reference to Fig. 1.

Figure 3:
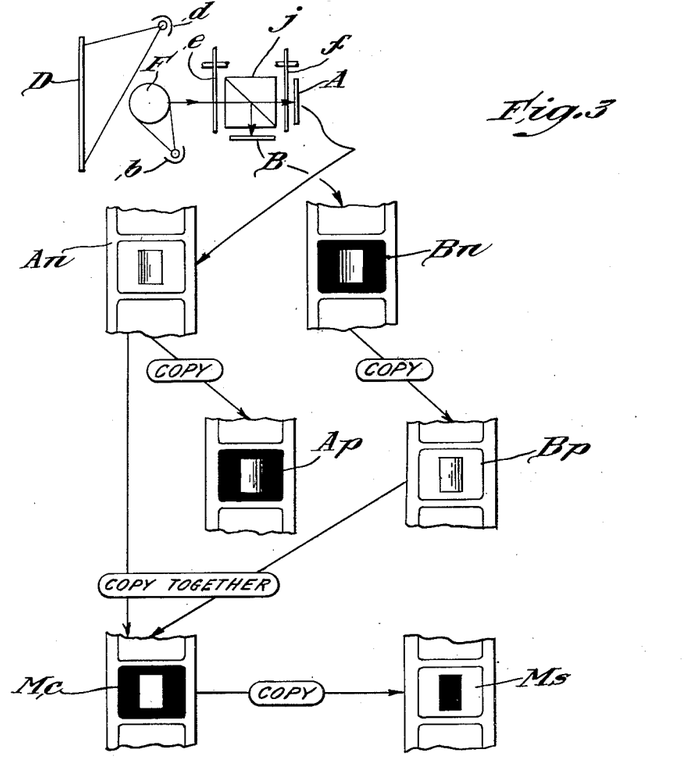
Fig. 3 is a flow diagram of the process of preparing masks with apparatus according to Figs. 1 or 2.

Fig. 3 shows the films A and B of Fig. 1 developed as negatives An and Bn, having, due to the flash illumination of backing D while shutter f obstructs film A, different densities through their respective background portions. These negatives are copied to provide positives Ap and Bp. Negative An is then used with positive Bp for printing a complementary background mask Mc from which is subsequently printed another film providing a foreground silhouette Ms. With these masks composite prints can then be prepared according to any desirable procedure, analogous to those to be described below with particular reference to color photography.

Silhouette masks and complementary masks made in accordance with this invention may be rendered dense or opaque by any convenient means for example they may be made dense to light of selected wave lengths by staining them with dyes which absorb these wave lengths.

The operation of equipment according to Figs. 1 and 2 will now be explained more in detail with reference to Figs. 4 to 7.

Figure 4:
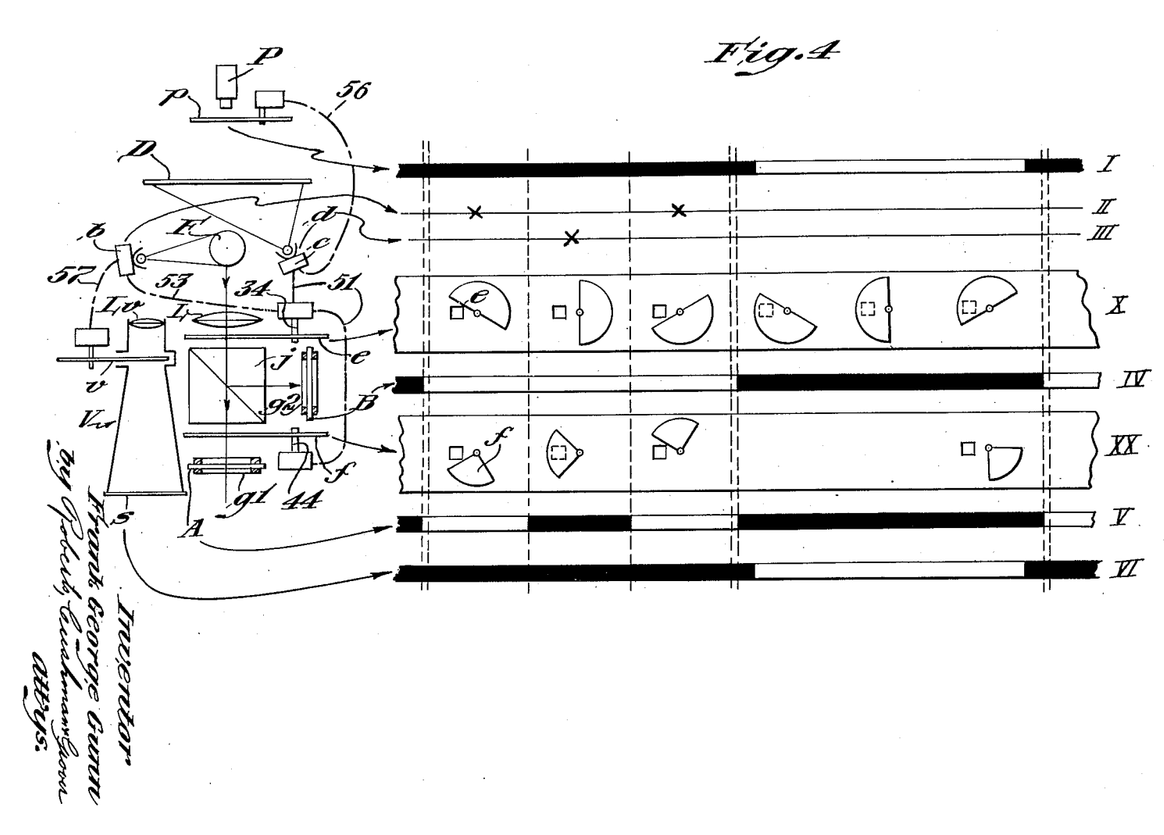
Fig. 4 is a diagram explaining one embodiment of the invention, namely that with occlusion of a film gate by means of an auxiliary shutter during a complete exposure period permitted by a main shutter; this figure also illustrates a system according to the invention which incorporates provisions for presenting to actors and supervisors the background component with which the foreground scene is to be combined, and for permitting the cameraman convenient viewing of the complete composite scene, without disturbance by sudden changes of illumination of one or the other part of the field.
Figure 5:
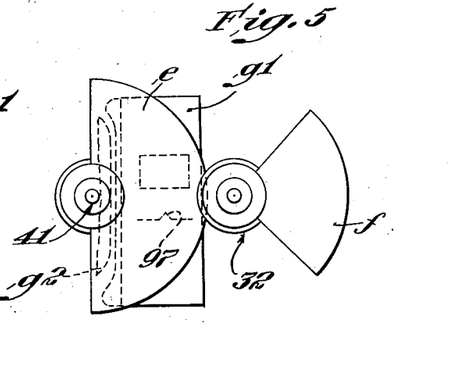
Figs. 5, 6 and 7 are front elevation, side elevation and top view respectively, of the essential elements including lens, light divider and shutters of a camera suitable for carrying out the present invention.
Figure 6:
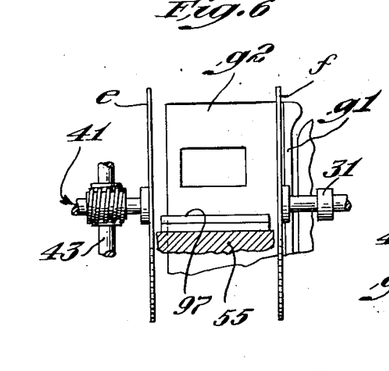
Figure 7:
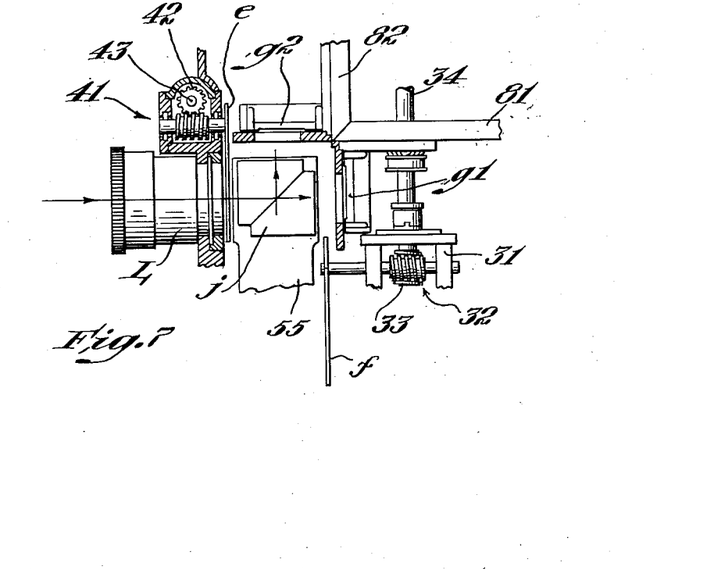

Fig. 4 shows diagrammatically and Figs. 5 to 7 more in detail, the optical and film gate portion of a camera of the type described in U. S. Patent No. 2,072,091 to J. A. Ball et al., dated March 2, 1937. Cameras of this type have a prism table 55 mounted on the camera frame and comprising a knife edge 97 for adjustably supporting the prism mount. A film gate support structure 81, 82 is likewise mounted on the camera housing and supports gates g1 and g2. The camera lens L is mounted on a hinged door structure which contains the drive for main shutter e, as described in detail in Patent No. 2,059,426, to L. E. Whittaker, dated November 3, 1936. The auxiliary shutter f is supported on brackets 31 of gate support 81 and is driven from a helical gear drive indicated at 32. Gear wheel 33 is fixed to shaft 34 which is geared, in a manner not shown as immaterial, to the film transporting mechanism, which is in turn geared to the drive of the main shutter, so that both shutters are driven in synchronism. The main shutter e is at 41 journaled in the lens supporting door structure and at 42 geared to the driving shaft 43 which is coaxial with the pintle of the lens door.

In the embodiment herein described, the main shutter has, as shown in Figs. 4 and 5, an opening of approximately 180° whereas the auxiliary shutter f has an opening of 270°, leaving a shuttering segment of 90° which is symmetrical with the opening of the main shutter so that the auxiliary shutter f obstructs gate g1 during one half of the opening period of the main gate with shutter e, before and after one-quarter periods of opening of both film gates.

Fig. 4 indicates the backing or dummy background D which may be translucent and is illuminated by means of a lamp or lamps d for example of the electric discharge type which, controlled by suitable and conventional electronic or electro-mechanical equipment c, can be flashed with very exacting time control and thus appropriately synchronized with the camera drive, as indicated by connection 51 of Fig. 4, between lamp control c and the shutter drive 34, 44. The foreground F can be illuminated by a lamp system b which may be similar to system d, and joined by means of a synchronizing connection 53 to lamp system d and shutter drive 34, 44. The backing D may be translucent and associated with a background projector P having a shutter p which, through a synchronizing connection 56, is connected to the lamp and camera drives.

The camera can be further provided with a view finder system V of conventional type, with lens system Lv and viewing screen s. This view finder is provided with a view finder shutter v whose drive is connected to the above mentioned lamp projector and camera drive through appropriate synchronizing means 57. It will be understood that the interconnection of camera shutters, view finder shutter, lamps and projector can be accomplished by mechanical drives including flexible shafting, or electrically by means of synchronous motors or appropriate servo apparatus, for example of the "Selsyn" type.

The film gates $g1$ and $g2$ can contain conventional films for recording black and white records, or in one film gate, for instance gate $g2$, a bipack consisting of a red sensitive red aspect recording film and a blue sensitive blue aspect recording film, whereas gate $g1$ can contain a green sensitive green recording film. A system of this type is described in Patent No. 1,889,030 to J. A. Ball, dated November 29, 1932, which also describes the film structure and the associated filter provisions more in detail. As a further alternative, one film gate can contain a monopack film, sometimes also referred to as multilayer film or integral film pack, for example of the types well known in the art under the trade-marks "Kodachrome" or "Agfacolor."

Fig. 4 indicates the operation of a system of this type by means of six time lines indicating at I the opening periods of projector shutter $p$, at II and III the illumination of foreground and backing lamps $b$ and $d$ respectively, at IV and V the opening and closing periods of shutters $e$ and $f$ respectively, and at VI the opening periods of view finder shutter $v$. It will be understood that the finder shutter can be open for those portions of the period of exposure during which the backing light is not on. In addition, strips X and XX indicate the positions of shutters $e$ and $f$ respectively, correlated to time lines I to VI.

Assuming by way of example utilization of both foreground and backing flashing apparatus in the manner to be described in detail hereinbelow, the following will be a possible sequence of operations during a period of exposure of each frame, further assuming that, as mentioned above, the auxiliary shutter closes for one-half of the opening period of the main shutter, half way during this main exposure period.

Before the commencement of exposure the foreground F will be dark (or, if it is continuously lighted rather than flashed, suitably illuminated), the background will be dark, and the main shutter $e$ will be closed. The camera is then started and while the main shutter remains closed the two films A and B (or their equivalent including color film material) are moved into their respective gate apertures $g1$ and $g2$ respectively, brought to rest and accurately registered for position. The main shutter $e$ is then opened, permitting light to pass through the camera lens L into the beam splitter $j$, which causes identical images to be formed on each of the two film systems. During this period of exposure of both film systems, the foreground can be flashed by means of lamp system $b$, as indicated in Fig. 4, or both backing and foreground can be flashed, or the backing can receive uniform illumination from a non-varying light source. After both films have received a short exposure, the secondary shutter $f$ covers aperture or film gate $g1$ so as to interrupt the light falling on film A, and while this film is protected from further exposure for the time being, the backing illumination can be switched on and off, for example by flashing light system $d$, as indicated in Fig. 4. If the backing is flashed during the preceding period, as mentioned above, the foregoing will be flashed when auxiliary shutter $f$ protects gate $g1$. In this manner only one film is exposed to the light from the background, or foreground respectively. The secondary shutter then opens and both films are again exposed to illumination by light from the foreground, and if desired background, for the remainder of the period of exposure of the corresponding frames until the main shutter closes again. In this manner are produced two sets of photographic records of the foreground which, having been started and finished at the same time, are identical in their outside dimensions and positions. As previously indicated, the smudged or blurred image of a fast moving foreground object will be resolved on the film whose exposure was interrupted, into two components, one representing the beginning and one the end of the action, but the overall "action envelope" of the two frames will be identical.

During the ensuing period when both shutters are closed, the shutter $p$ opens projector P and permits projection of the background scene, as indicated at I. Similarly, the view finder shutter $v$ now opens the view finder system, so that the camera man is able to observe both foreground and background unirritated by light flashes on foreground or backing or both. In order to enable the camera man to see in the view finder more than a silhouette of the foreground, the foreground scene may be illuminated during the period between the camera exposures.

It will be appreciated that if the dummy background is brilliantly illuminated by lamps other than that in the projector, the projected picture of the real background will not be clearly seen. It is however frequently desirable to project a film of the real background which will be subsequently printed into the composite picture, onto the plain backing so that the persons concerned with the photography of the foreground component can arrange the actors and objects comprising the foreground scene so that they will be in correct composition and time relationship with the real background when the composite picture is finished. It is particularly desirable that the cameraman should see both foreground and background with the maximum possible clarity so as to be able to compose the foreground correctly in relation to the background of the completed composite scenes. Since it is usually unnecessary for the dummy background or backing to be illuminated while the main camera shutter is closed so that this backing illumination may be switched off or interrupted while the camera shutter is closed and the projector shutter open, it is possible to satisfy these requirements by driving the projector camera and light interrupting mechanisms in fixed phase relationship so that the general illumination of the backing is greatly reduced each time the camera shutter is closed and during each such period the projector shutter opens allowing the images of the real background film to be projected onto the dummy background. Such apparatus may consist of an opaque object capable of being moved into position by any suitable means so as to interrupt the observer's view for each period of time that light from a lamp or lamps other than the lamp in the film projector falls upon the backing, as for example projector shutter $p$ and view finder shutter $v$ which are in suitable phase relationship with the projection of images of the real background scene onto the screen, so that during each period of time that the camera man's view is not interrupted he sees the foreground and a projected image of the real background.

Having now described the system according to the invention in its general applicability to composite photography and apparatus suitable for carrying it out in the field of motion picture photography generally, an embodiment will now be described with reference to Fig. 8, which is related to color cinematography wherein three color aspects are originally recorded on emulsions on three separate supports.

Figure 8:
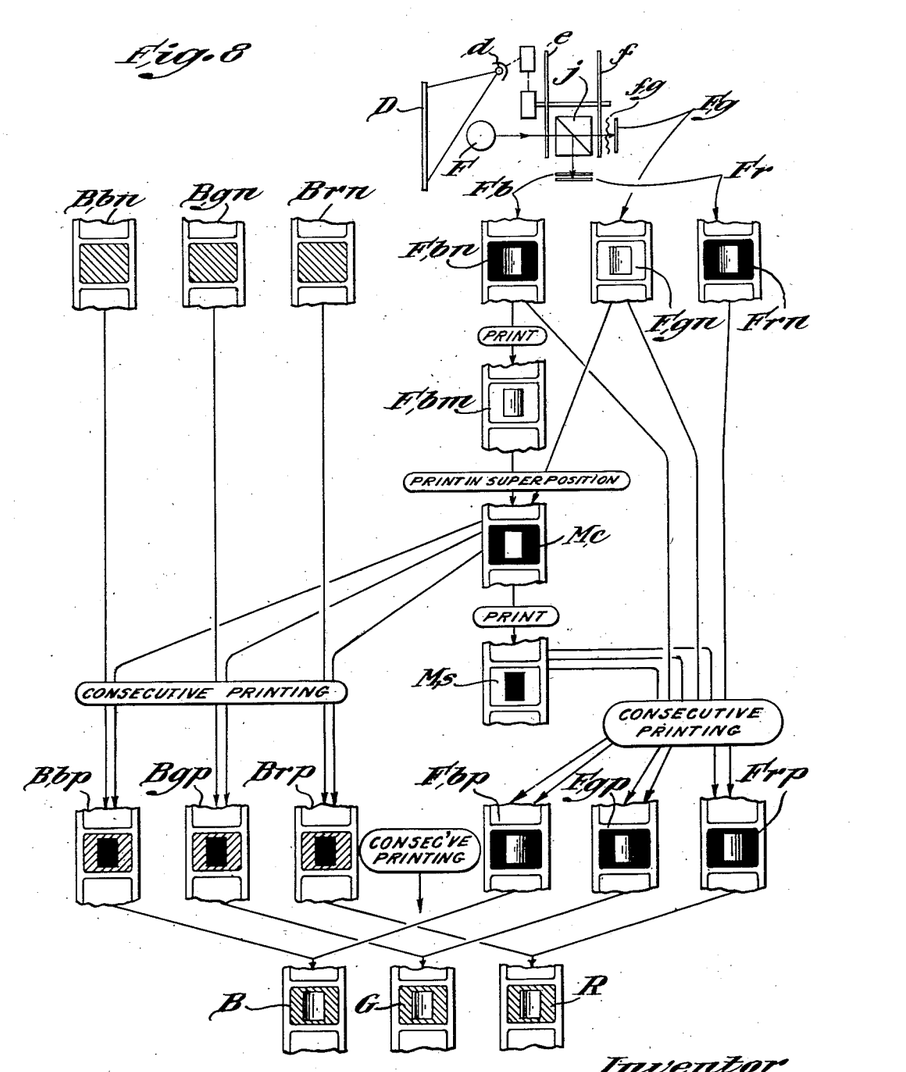
Fig. 8 is a flow diagram of one embodiment of the process according to the invention, employing three separate films for recording three color aspects as well as for making a silhouette mask.

In Fig. 8, B$bn$, B$gn$ and B$rn$ represent negatives of a background scene, obtained in any conventional manner, for example with a camera according to the above mentioned patents.

Fig. 8 indicates the set-up for taking the foreground scene in the manner of Fig. 4, and it will be noted that two films F$b$ and F$r$ are arranged in the reflected light beam, controlled only by main shutter $e$, whereas a single film F$g$ is arranged in the direct or undeviated light beam behind auxiliary shutter $f$. The blue and red aspects are recorded on films F$b$ and F$r$ in the first mentioned aperture, and the green aspect on film F$g$ in the second aperture. A green transmitting filter $fg$ is arranged before film F$g$, and films F$b$, F$r$ are sensitized and arranged to record the blue and red color aspects. The shutter arrangement may be that shown in Figs. 5 to 7. It may be assumed by way of example that flash illumination of backing D alone is provided, during the period when film F$g$ is shuttered by auxiliary shutter $f$. Backing flash lamp $d$ is synchronized with shutters $e$ and $f$. It will be understood that the projector and view finder arrangements described with reference to Fig. 4 can be applied to this set-up.

As will now be evident from the above explanation referring to Figs. 1 to 4, films F$b$ and F$r$ are exposed to the flashed backing, when film F$g$ is protected by auxiliary shutter $f$, which results, as indicated in Fig. 8, in three color aspect negatives F$bn$, F$gn$ and F$rn$ of the foreground only, with the background portion practically opaque for the blue and red aspect negatives and essentially clear for the green aspect negatives.

From one of the negatives with opaque background portion, for example film F$bn$, is now prepared a print F$bm$ which, as indicated in Fig. 8 carries a positive of the foreground against a clear background portion. The positive F$bm$ is then printed in superimposition with negative F$gn$ which, it will be remembered, carries a foreground negative on a fairly clear background area. The resulting record is of the character of a complementary mask indicated at M$c$ of Fig. 8. From this complementary mask a silhouette mask M$s$ is printed. As clearly indicated in Fig. 8, background negatives and foreground negatives are then combined in conventional manner with the aid of the two masks, by consecutively printing the background negatives with complementary mask M$c$ to obtain background master positives B$bp$, B$gp$ and B$rp$. Similarly foreground master positives F$bp$, F$gp$ and F$rp$ are obtained by consecutive printing of the foreground negatives with silhouette mask M$s$. As further indicated in Fig. 8, these master positives carry positive records of the background scene with the foreground portions opaque and positive records of the foreground scene with the background portions opaque. These master positives are then combined by consecutive printing to furnish duplicate negatives, B, G, R of the combined foreground and background scenes, which duplicates are the first composite records. From these duplicates, gelatin relief matrix positives can then be made according to conventional methods, and used to print the final color positive by way of imbibition printing with yellow, magenta, and cyan dyes respectively.

As mentioned above, when the backing or dummy background is illuminated, the edges of the objects in the foreground are illuminated by the light from behind and reflected light therefrom passes to the film forming records which appear to be surrounded by a rim of light. If as described above with reference to Fig. 8, color aspect recording films are used in both camera apertures one of which does not receive this reflected backing illumination or rim light from the edges of the objects in the foreground, the foreground objects of the final composite color film will appear to be surrounded by an objectionable colored rim. If a film recording all color aspects is used in a manner not exposing it when the backing is illuminated, then there will be no rim of light around the records at all. An embodiment of the invention accomplishing this result will now be described with reference to Fig. 9.

Figure 9:
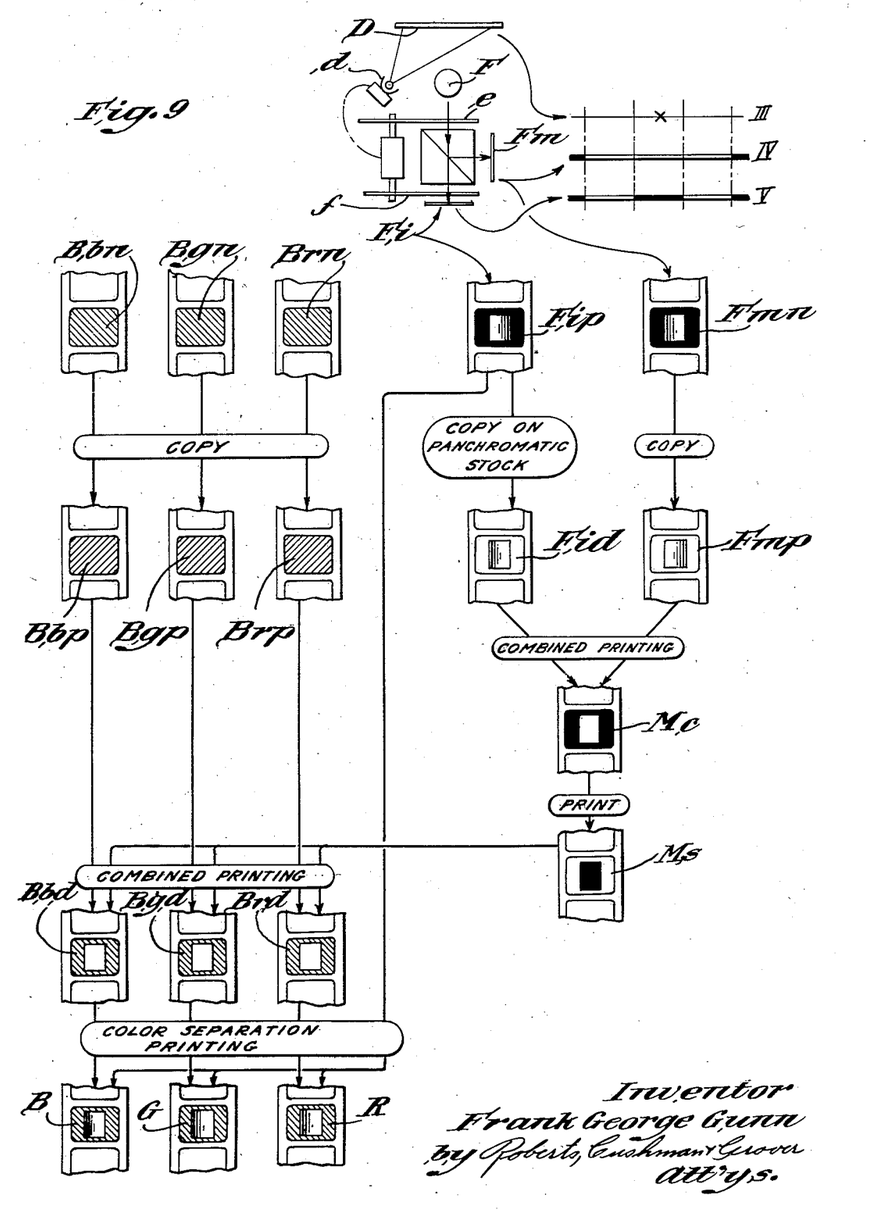
Fig. 9 is a flow diagram similar to Fig. 8, illustrating the application of the invention to the taking of a complete color record on a single film with superimposed emulsions, arranged so as to avoid color fringes of the foreground portion.

Fig. 9 again diagrammatically indicates the foreground taking setup in the manner of Fig. 4 with corresponding identification marks, but with the difference that a film F$i$ of the monopack or multilayer type is now used behind auxiliary shutter $f$. Fig. 9 also indicates, at III, the correlation of the backing flash with the opening periods of shutters $e$ and $f$, indicated at IV and V respectively. It will be observed that the backing flash occurs when auxiliary shutter $f$ closes the aperture of the color recording film, whereas the backing is dark when both shutters are open for exposure of the color film as well as an ordinary black and white recording film F$m$ in the reflected beam.

Film F$i$ is developed by conventional reversal color developing processes to furnish a positive with a dense backing portion, indicated at F$ip$ of Fig. 9. The film F$m$ furnishes a negative F$mn$ of the foreground, with dense background portion. The film F$ip$ is then copied on panchromatic stock, furnishing a black and white negative F$id$ on a practically clear backing portion. A master positive F$mp$ is made from negative F$mn$. Duplicate negative F$id$ and master positive F$mp$ are then copied together, furnishing a complementary mask record M$c$. From this, a silhouette mask M$s$ is then copied.

From conventionally obtained color separation negatives B$bn$, B$gn$ and B$rn$ are prepared master background positives B$bp$, B$gp$ and B$rp$. The background masters are then printed in superimposition with silhouette mask M$s$ which furnishes duplicate background negatives B$bd$, B$gd$, B$rd$ with unexposed foreground portions. Into these unexposed foreground portions the color positive F$ip$ is then printed with appropriately selectively colored light, furnishing three color separation duplicate negatives B, G, R, which can again be used to produce imbibition matrix positives.

As pointed out above, the technique according to Fig. 9 furnishes a composite film without any fringes of the foreground portion, due to the fact that the film which is used for obtaining the complete color record is never exposed to the flashed backing. It might be desirable to use the color recording film in the aperture which contains the film which is exposed to a flashed area, producing white fringes. A system of this type is diagrammatically illustrated in Fig. 10, which will now be described.

Figure 10:
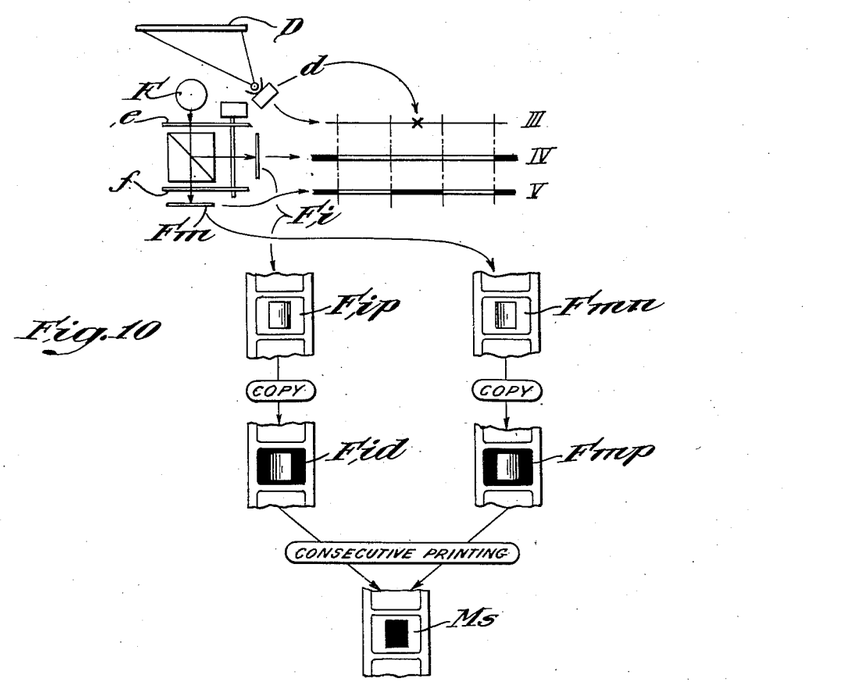
Fig. 10 is a similar diagram illustrating a third embodiment, with the mask record behind the auxiliary shutter and the backing flashed.

The diagram of Fig. 10 clearly indicates that the mask film $Fm$ is exposed behind the auxiliary shutter $f$ whereas the color film $Fi$ is in the reflected beam and hence exposed to the background flash which might produce a white, comparatively unobjectional fringe around the foreground portion.

The color recording film $Fi$, developed as positive, furnishes a foreground color positive $Fip$ on a practically clear backing portion. The other film $Fm$, developed as negative, furnishes a negative $Fmn$ likewise on a clear backing area. A duplicate negative $Fid$ is printed from the positive $Fip$ on panchromatic stock, furnishing a negative of the foreground on an opaque backing portion. The negative $Fmn$ is likewise copied, furnishing a positive $Fmp$ of the foreground on an opaque backing portion. By consecutively printing from duplicate $Fid$ and positive $Fmp$, a silhouette mask $Ms$ is obtained from which a complementary mask can be obtained as above described. With the aid of these masks, background negatives can again be combined with the foreground color record $Fip$.

The embodiments so far described employed apparatus for flashing the backing. As mentioned above, it is quite feasible to flash the foreground scene instead, and an embodiment of that type will now be described with reference to Fig. 11.

Figure 11:
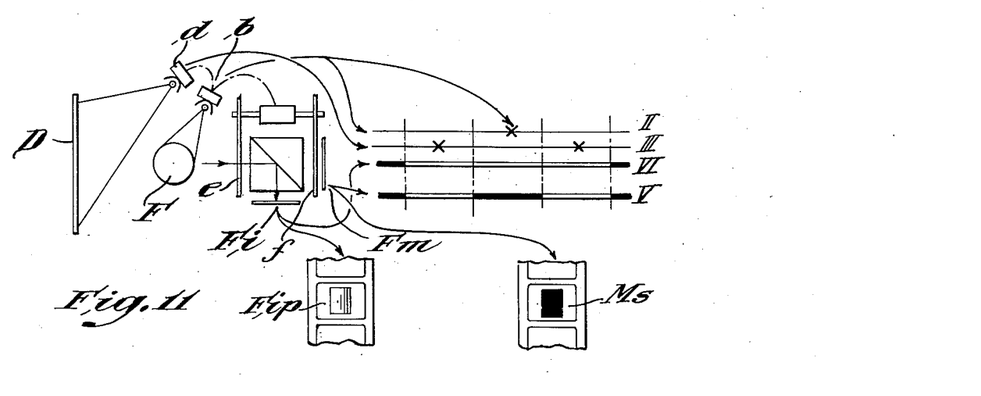
Fig. 11 is a flow diagram similar to Fig. 10 of an embodiment which employs flashing of the foreground part of the field, with a complete color recording film in the gate controlled by the main shutter.

Fig. 11 is quite similar to Fig. 9, with the only difference that the foreground is flashed while the black and white recording film $Fm$ is shuttered by auxiliary shutter $f$. As mentioned above, it is sometimes desirable to flash backing as well as foreground scene; the embodiment according to Fig. 11 represents such an arrangement.

As will now be evident without further detailed explanation, the color film $Fi$ furnishes a color positive $Fip$ on a practically clear background portion, since the color film is exposed to backing illumination as well as to foreground flash. The masking film $Fm$, behind the auxiliary shutter $f$ is not exposed to the foreground flash but only to the backing, therefore directly furnishing a complementary mask $Ms$ with a dense portion on a clear backing portion. Foreground positive and silhouette mask are again used to manufacture composite color aspect records according to techniques needing no further explanation in view of the above description referring to Figs. 8, 9 and 10.

It will be observed that the technique according to Fig. 11, although directly furnishing a mask, might cause a white fringe around the foreground portion, because the color film $Fi$ is exposed to the backing illumination.

It will be obvious to those skilled in this art that any or all of the various films used may be developed as positives or negatives.

As previously mentioned, the cooperation of main and auxiliary shutters can be modified, and such possibilities will now be discussed with reference to Figs. 12 to 16. Figures 12 to 15 indicate diagrammatically in the manner of Fig. 4, the relation of the illuminating periods to the opening and closing periods of main and auxiliary shutters.

Figure 12:
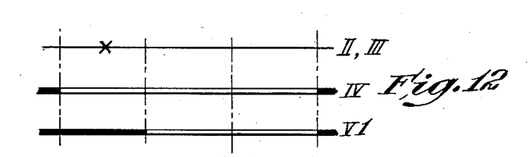
Figs. 12 and 13 are diagrams similar to the time line portion of Fig. 4, illustrating modifications wherein the auxiliary shuttering period is moved toward the beginning, and at the end of the main exposure period.
Figure 13:
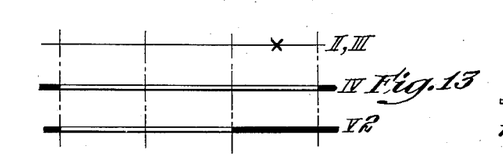

In accordance with Figs. 12 and 13, the auxiliary shutter obstructs its film gate towards the beginning or the end of the main exposure period. Although main and auxiliary exposure are not altogether simultaneous in this case, the time parallax is still negligible since the main exposure remains an envelope of the other exposure.

Figure 14:
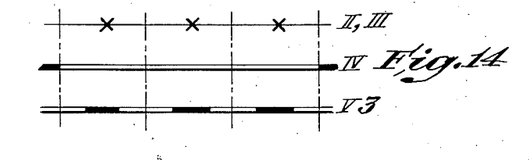
Fig. 14 is a diagram similar to Figs. 12 and 13 illustrating an embodiment wherein several auxiliary shuttering and flashing periods occur within one main exposure period.

Another possible modification is shown in Fig. 14, namely that of interrupting with the secondary shutter that exposure of one film more than once in each total period of exposure. Each such interruption being accompanied by a flash of the backing or foreground illumination. As previously mentioned multiple flashing during each exposure period may be beneficial due to the fact that flash lamps of the electric discharge type give greater luminous efficiency for a given power consumption if ignited with intermittent electrical impulses. This modification also has the advantage that the silhouette masks and complementary masks match more accurately the blurred image of a fast moving object in the foreground.

It will be evident that the modifications of operation diagrammatically shown in Figs. 12 and 13 arise from the primary modification as shown in Fig. 4, namely with the auxiliary shuttering period at the very middle of the main shuttering period, by advancing or retarding the auxiliary period within the normal period of cinematographic exposure.

Figure 15:
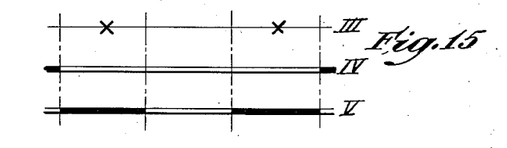
Fig. 15 is a diagram similar to Fig. 14 illustrating an embodiment with two auxiliary shuttering periods with flashings therewithin.

Fig. 15 illustrates a further possibility of shuttering as follows.

The action of the secondary or auxiliary shutter $f$ can be reversed and the timing of the backing flashes altered so that when the main shutter opens the secondary shutter remains closed for the time being, and during this brief moment the backing is flashed on and off. Then the secondary shutter opens, allowing an exposure of the foreground only to be made on its associated film. Then the secondary shutter closes and once again the backing is flashed for the remainder of the exposure period.

Figure 16:
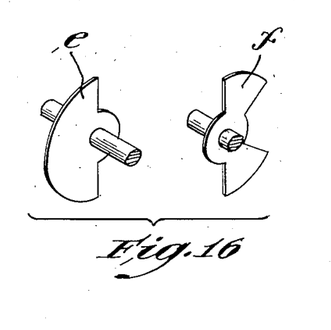
Fig. 16 is a diagram of main and auxiliary shutters suitable for the embodiment illustrated in Fig. 15.

Fig. 16 shows main and auxiliary shutters $e$, $f$ having apertures suitable for the operation according to Fig. 15.

Figure 17:
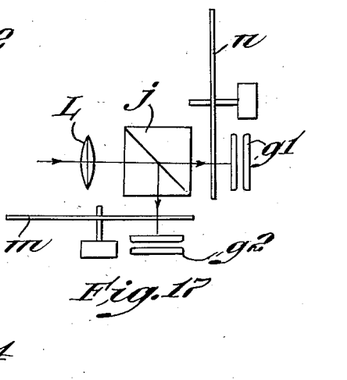
Fig. 17 is a diagram of a light dividing system with two shutters in the respective component beams instead of in the unsplit beam and one component beam.
Figure 18:
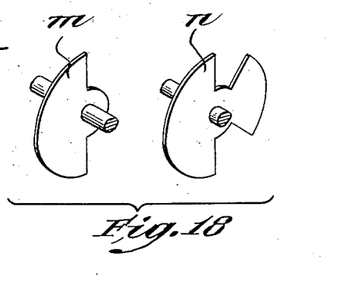
Fig. 18 is a diagram of shutters suitable for the arrangement according to Fig. 17.

Fig. 17 diagrammatically indicates a modification which, instead of one main and one secondary or auxiliary shutter employs two shutters $m$, $n$ each of which obstructs a divided or secondary beam. In order to obtain the effect diagrammatically indicated in Fig. 4, the shutters arranged as shown in Fig. 17 have to be apertured as shown in Fig. 18 which will be comprehensible without further explanation having in mind that one of the films, in order to obtain a density characteristic different from that of the other, must be obstructed during the exposure period of the other.

It may be desirable to replace periodical illumination by artificial means (as for example mercury vapor flash lamps connected to or controlled by a pulsating electrical supply, or continuously burning lamps whose light is interrupted by a mechanical shutter of suitable design) by daylight illumination. Illumination by artificial means has certain drawbacks mainly that the operating cost is relatively high and that it is difficult to obtain even illumination particularly on backings of large size.

Figure 19:
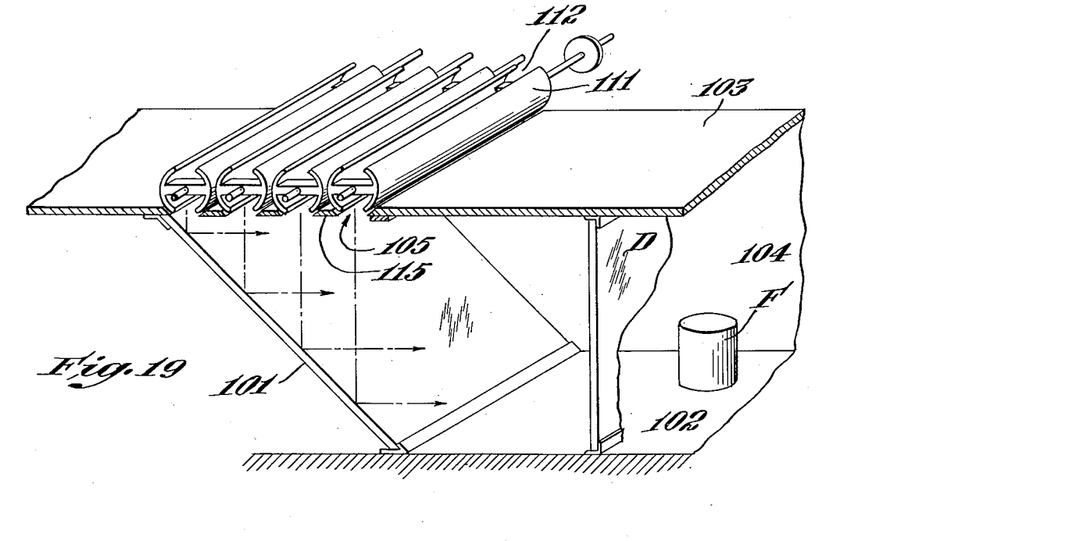
Fig. 19 is a diagrammatic illustration of an arrangement for illuminating a backing by means of daylight.

In accordance with one aspect of the present invention, illustrated in Fig. 19, a setup for use in taking foreground scenes for composite motion picture photography comprises an inclined reflector 101 housed in a studio or chamber having lightproof floor, ceiling and walls, as indicated at 102, 103 and 104 respectively, and an opening 105 in the roof through which daylight rays can enter and fall upon the reflector. For breaking up the daylight into a series of flashes before reaching the camera one or more shutters are provided in the roof opening 105, these shutters consisting of rollers 111 slotted longitudinally at 112, mounted on suitable bearings on the roof and geared together and driven synchronously with the camera arrangement at a predetermined speed, for example 720 revolutions per minute. Each time the slots come into approximately vertical position, the light rays pass therethrough as indicated in Fig. 19 and fall on the reflector 101 and hence to the backing D and the camera. Leakage of light between the rollers may be prevented by suitable baffles 115.

It will be understood that the backing D is required only if it is desired to project the background scene thereon, as described above with reference to Fig. 4. If no such background projection is required, the reflecting surface 101 constitutes the backing.

If desired, the daylight rays may be reflected and concentrated on the shutters by means of suitable external reflectors and the shutters may have lenses associated therewith to converge or diverge the light rays. Instead of having the shutters in the opening in the roof, they may be disposed in front of the reflector, for example between the reflector and the camera or they may be disposed adjacent to the surface of the reflector. If desired a suitable diffusing screen or light controlling means may be provided in suitable position between the illuminated backing D and the foreground F. The light controlling means may for example employ a sheet of fine black gauze, interposed if the daylight reflected from backing 101 is too strong.

The camera and the rollers being driven in fixed phase relationship, the requisite number of short flashes of natural daylight passes through the slotted rollers onto the reflector serving as a backing from which they are thrown forward to the camera. In this manner large backing areas can be illuminated as required without any form of artificial lighting and at greatly reduced cost.

It will now be evident that the system according to the invention provides essentially simultaneously exposed cinematographic film records of different density characteristics suitable for the production of silhouette and complementary masks, by exposing the film during a period of analysis to a different combination of foreground and backing illumination. The illumination of backing or foreground does not necessarily vary from one extreme to the other, but it is essentially that during that part of an exposure or analysis period when only one film is exposed, the illumination of the part of the field which is being thus photographed is substantially increased; this part of the total scene may either be backing or the foreground. One film it preferably exposed during an entire exposure period or interval, whereas the other film is exposed only during part or parts of that interval, during which part the illumination of one of the field parts is substantially changed.

Instead of supplying a normally dark and periodically flashed backing, the foreground scene may be normally dark and flashed while only one film is exposed, with the backing constantly illuminated or suitably flashed.

It will now be further apparent that several variations of the principally described system are possible without deviating from the spirit of the invention.

For example, the secondary shutter might interrupt the exposure of one film more than once in each period of exposure of the corresponding frames, such as interruption being accompanied by a flash of the background or foreground illumination. Although it is preferable to close one film gate well within the period during which the other gate is open, while either backing or foreground is flashed, it is possible to move the closing period of one gate towards the beginning or the end of the opening period of the other gate.

The backing or foreground part of the field may be flashed or its illumination substantially increased during the time when the auxiliary shutter is closed during the exposure period of the other shutter. The other part of the field, for example the backing if the foreground is flashed, may remain illuminated during the entire opening period of the main shutter, but it is quite feasible to illuminate this other component, for example the backing, only during the periods when both shutters are open, since illumination of the other component during the remaining period is irrelevant.

The last mentioned arrangement, namely flashing of both backing and foreground, may be advantageous although it is not essential, since it permits the use of mercury vapor flash lamps for purposes of the invention, which lamps give greater luminous efficiency for a given power consumption if ignited with powerful intermittent electrical impulses. Further, the arrangement with intermittent illumination of both backing and foreground has, for reasons discussed below, the advantage of reducing the amount of scattered light falling onto the foreground after reflection especially from the backing, and also from walls, ceiling and floor of the studio.

It should be understood that the present disclosure is for the purpose of illustration only and that this invention includes all modifications and equivalents which fall within the scope of the appended claims.

I claim:

1. In the art of making a composite picture from separate exposures of foreground and background scenes by means of a mask having an outline corresponding to that of the foreground portion of the picture, the method of making the mask which comprises exposing a plurality of films to a field including a foreground part and a background part, the films being exposed concomitantly during recurrent intervals, one of the films being exposed during only a part of each interval, and changing the illumination of one of said parts of the field during said part of each interval.

2. In the art of making a composite picture from separate exposures of foreground and background scenes by means of a mask having an outline corresponding to that of the foreground portion of the picture, the method of making the mask which comprises exposing a plurality of films to a field including a foreground part and a background part, the films being exposed concomitantly during recurrent intervals, one of the films being exposed to the background part of the field during only a part of each interval, and changing the illumination of the background part of the field during said part of each interval.

3. In the art of making a composite picture from separate exposures of foreground and background scenes by means of a mask having an outline corresponding to that of the foreground portion of the picture, the method of making the mask which comprises exposing a plurality of films to a field including a foreground part and a background part, the films being exposed concomitantly during recurrent intervals, one of the films being exposed during only a part of each interval and, during said part of each interval, increasing the illumination on the part of the field being photographed.

4. In the art of making a composite picture from separate exposures of foreground and background scenes by means of a mask having an outline corresponding to that of the foreground portion of the picture, the method of making the mask which comprises exposing a plurality of films to a field including a foreground part and a background part the films being exposed concomitantly during recurrent intervals, one of the films being exposed to the background part of the field during only a part of each interval and, during said part of each interval, increasing the illumination of the background part of the field.

5. In the art of making a composite picture from separate exposures of foreground and background scenes by means of a mask having an outline corresponding to that of the foreground portion of the picture, the method of making the mask which comprises exposing a plurality of films to a field including a foreground part and a background part, the films being exposed concomitantly during recurrent intervals, one of the films being exposed during only a part of each interval and the other film being exposed during all of the each interval, and changing the illumination of one of said parts of the field during said part of each interval.

6. In the art of making a composite picture from separate exposures of foreground and background scenes by means of a mask having an outline corresponding to that of the foreground portion of the picture, the method of making the mask which comprises exposing a plurality of films to a field including a foreground part and a background part, the films being exposed concomitantly during recurrent intervals, one of the films being exposed to the background part of the field during only a part of each interval and the other film being exposed during all of each interval, and changing the illumination of the background part of the field during said part of each interval.

7. In the art of making a composite picture from separate exposures of foreground and background scenes by means of a mask having an outline corresponding to that of the foreground portion of the picture, the method of making the mask which comprises exposing a plurality of films to a field including a foreground part and a background part, the films being exposed concomitantly during recurrent intervals, one of the films being exposed during only a part of each interval and the other film being exposed during all of each interval and, during said part of each interval, increasing the illumination on the part of the field being photographed.

8. In the art of making a composite picture from separate exposures of foreground and background scenes by means of a mask having an outline corresponding to that of the foreground portion of the picture, the method of making the mask which comprises exposing a plurality of films to a field including a foreground part and a background part, the films being exposed concomitantly during recurrent intervals, one of the films being exposed to the background part of the field during only a part of each interval and the other film being exposed during all of each interval and, during said part of each interval, increasing the illumination of the background part of the field.

9. In the art of making a composite picture from separate exposures of foreground and background scenes by means of a mask having an outline corresponding to that of the foreground portion of the picture, the method of making the mask which comprises exposing a plurality of films to a field including a foreground part and a background part, shuttering the films concomitantly at recurrent intervals, intermittently advancing the films during said intervals, exposing each film during intermediate intervals, one of the films being exposed during only a part of each intermediate interval, and changing the illumination of one of said parts of the field during said part of the intermediate interval.

10. In the art of making a composite picture from separate exposures of foreground and background scenes by means of a mask having an outline corresponding to that of the foreground portion of the picture, the method of making the mask which comprises exposing a plurality of films to a field including a foreground part and a background part, shuttering the films concomitantly at recurrent intervals, intermittently advancing the films during said intervals, exposing each film during intermediate intervals, one of the films being exposed to the background part of the field during only a part of each intermediate interval, and changing the illumination of the background part of the field during said part of the intermediate interval.

11. In the art of making a composite picture from separate exposures of foreground and background scenes by means of a mask having an outline corresponding to that of the foreground portion of the picture, the method of making the mask which comprises exposing a plurality of films to a field including a foreground part and a background part, shuttering the films concomitantly at recurrent intervals, intermittently advancing the films during said intervals, exposing each film during intermediate intervals, one of the films being exposed during only a part of each intermediate interval and, during said part of the intermediate interval, increasing the illumination of the part of the field being photographed.

12. In the art of making a composite picture from separate exposures of foreground and background scenes by means of a mask having an outline corresponding to that of the foreground portion of the picture, the method of making the mask which comprises exposing a plurality of films to a field including a foreground part and a background part, shuttering the films concomitantly at recurrent intervals, intermittently advancing the films during said intervals, exposing each film during intermediate intervals, one of the films being exposed to the background part of the field during only a part of each intermediate interval and, during said part of the intermediate interval, increasing the illumination of the background part of the field.

13. In the art of making a composite picture from separate exposures of foreground and background scenes by means of a mask having an outline corresponding to that of the foreground portion of the picture, the method of making the mask which comprises exposing a plurality of films to a field including a foreground part and a background part, the films being exposed concomitantly during a common interval, one of the films being opened for exposure during one and shuttered during another part of the interval, and changing the illumination of one of said parts of the field during one of said parts of the interval.

14. The method according to claim 13 wherein the illumination of the background part of the field is changed during said shuttered part of the interval.

15. The method according to claim 13 wherein the illumination of the background part of the field is changed during said opened part of the interval.

16. The method according to claim 13 wherein the illumination of the foreground part of the field is changed during said shuttered part of the interval.

17. The method according to claim 13 wherein the illumination of the foreground part of the field is changed during said open part of the interval.

18. The method according to claim 13 wherein the foreground part of the field is continuously illuminated and the illumination of the background part is changed during the shuttered part of the interval.

19. The method according to claim 13 wherein the background part of the field is continuously illuminated and the illumination of foreground part is changed during the shuttered part of the interval.

20. The method according to claim 13 wherein the illumination of background as well as foreground parts of the field is changed during alternate opened and shuttered parts of the interval.

21. The method according to claim 13 wherein said changing of illumination is effected by flashing a lamp.

22. The method according to claim 13 wherein said intervals recur for the purpose of making motion pictures and said changing of illumination is synchronized with the recurring intervals.

23. The method according to claim 13 wherein a shuttered part of the interval occurs intermediate two opened parts.

24. The method according to claim 13 wherein a shuttered part of the interval begins approximately simultaneously with the common interval and is followed by an opened part.

25. The method according to claim 13 wherein a shuttered part of the interval ends approximately simultaneously with the common interval and is preceded by an open part.

26. The method according to claim 13 wherein several shuttered parts alternate with open parts of the common interval.

27. The method according to claim 13 wherein shuttered parts of the interval begin and end approximately with the common interval and are separated by an intermediate opened part.

28. In the art of making a composite color picture from separate exposures of foreground and background scenes by means of a mask having an outline corresponding to that of the foreground portion of the picture, the method of making the mask which comprises exposing a plurality of color sensitive emulsions to a field including a foreground part and a background part, the emulsions being exposed concomitantly during a common interval, one of the emulsions being opened for exposure to one color aspect of the field during one and shuttered during another part of the interval, and changing the illumination of one of said parts of the field during one of said parts of the interval.

29. The method according to claim 28 wherein two emulsions are in superimposition exposed to two color aspects during said opened parts of said interval, and a third emulsion is exposed to a third color aspect during the entire interval.

30. The method according to claim 28 wherein one emulsion is exposed to one color aspect during said opened part of said interval and two emulsions are in superimposition exposed to two color aspects during the entire interval.

31. The method according to claim 28 wherein two emulsions are exposed in superimposition to the blue and red aspects during the entire interval and an emulsion is exposed to the green aspect during said opened part of said interval, the illumination of the background part of the field being increased during said shuttered part of the interval.

32. In the art of making a composite color picture from separate exposures of foreground and background scenes by means of a mask having an outline corresponding to that of the foreground portion of the picture, the method of making the mask which comprises exposing a film carrying a plurality of superimposed color sensitive emulsions and an auxiliary film to a field including a foreground part and a background part, the films being exposed concomitantly during a common interval, one of the films being opened for exposure during one and shuttered during another part of the interval, and changing the illumination of one of said parts of the field during one of said parts of the interval.

33. The method according to claim 32 wherein a complete color picture is made on said superimposed emulsions, each of which records a different color aspect.

34. The method according to claim 32 wherein the superimposed emulsions are exposed during said opened part of said interval and the auxiliary film during the entire interval.

35. The method according to claim 32 wherein said foreground part of said field is illuminated at least during said opened part of the interval, said background part receives a flash of illumination during said shuttered part of the interval, the superimposed emulsions are exposed during said opened part, and the auxiliary film is exposed during said flash.

36. The method according to claim 32 wherein said foreground part of the field is illuminated during approximately the entire common interval, the background part is flashed during said shuttered part of the interval, the superimposed emulsions are exposed during said opened part of the interval, and the auxiliary film is exposed during the entire interval.

37. The method according to claim 32 wherein said auxiliary film is exposed during said opened part of the interval and said superposed emulsions are exposed during the entire interval.

38. The method according to claim 32 wherein said background part of the field is flashed during said shuttered part of the interval, the auxiliary film is exposed during said opened part of the interval, and the superimposed emulsions are exposed during the entire interval.

39. The method according to claim 32 wherein one of said films is exposed approximately during the entire common interval, the other film is exposed approximately only during said opened part of the interval, the illumination of one of said parts of the field is increasing during said opened part and the illumination of the other part of the field is increased during said shuttered part of the interval.

40. In the art of making composite motion pictures from separate exposures of foreground and background scenes by means of a mask having an outline corresponding to that of the foreground portion of the picture, the method of making the mask while presenting a composite of the actual foreground scene and a projected background scene, which comprises exposing a plurality of films to a field including a foreground part and a backing screen part, the films being exposed concomitantly during recurrent exposure intervals and occulted simultaneously during transport intervals alternating with said exposure intervals, one of the films being exposed during only a part of each exposure interval; illuminating said screen part of the field during at least part of each exposure interval with uniformly distributed light; and projecting said background scene on said backing screen during said transport intervals.

41. The method according to claim 40 wherein one of said parts of said field is flashed during one of said parts of said concomitant exposure interval.

42. In the art of making composite motion pictures from separate exposures of foreground and background scenes by means of a mask having an outline corresponding to that of the foreground portion of the picture, the method of making the mask while viewing the actual foreground scene, which comprises exposing in a camera having a view finder a plurality of films to a field including a foreground part and a background part, the films being exposed concomitantly during recurrent exposure intervals and occulted simultaneously during transport intervals alternating with said exposure intervals, one of the films being exposed during only a part of each exposure interval; changing the illumination to one of said parts of the field during at least part of said exposure intervals; illuminating both parts of the field with unchanged strength during said transport intervals; and occulting said view finder during said change of illumination.

43. In the art of making a composite picture from separate exposures of foreground and background scenes by means of a mask having an outline corresponding to that of the foreground portion of the picture, the combination of a camera having two film gates, a main optical axis, a light divider in said axis to divide the light into two branches leading to the two film gates respectively, for exposing a plurality of films to a field including a foreground part and a background part, shutter means for passing light to one gate during recurrent exposure intervals alternating with intervals during which both gates are occulted, and to the other gate during only a part of each of said exposure intervals, means for changing the illumination of one of said parts of the field, means for driving said shutter means and said illumination changing means, and means controlled by said driving means for actuating said illumination changing means during another part of each of said exposure intervals.

44. In the art of making a composite picture from separate exposures of foreground and background scenes by means of a mask having an outline corresponding to that of the foreground portion of the picture, the combination of a camera having two film gates, a main optical axis, a light divider in said axis to divide the light into two branches leading to the two film gates respectively, for exposing a plurality of films to a field including a foreground part and a background part, a shutter in said main axis for passing light during recurrent exposure intervals and a shutter in one of said branches for obstructing light to one of said gates during a part of each of said exposure intervals, means for changing the illumination of one of said parts of the field, means for driving said shutters and said illumination changing means, and means controlled by said driving means for actuating said illumination changing means during said part of each of said exposure intervals.

45. In a motion picture taking system including a camera of the type having a light divider with a semi-transparent reflector between the camera lens and two film gates, the combination of a camera shuttering arrangement including a main shutter arranged between lens and reflector and having a transmitting aperture covering the reflector during part of the full exposure cycle, and an auxiliary shutter engaged between the reflector and one of the gates and having a transmitting aperture covering said gate during the full exposure interval when the main shutter transmits light to the reflector; with light intensity modifying apparatus coupled with said shutters to operate in synchronism therewith, for increasing the illumination of an object to be taken with the camera when said gate is covered by the auxiliary shutter.

46. In the art of making a composite picture from separate exposures of foreground and background scenes by means of a mask having an outline corresponding to that of the foreground portion of the picture, a taking system comprising a camera having two film gates, a main optical axis, a light divider in said axis to divide the light into two branches leading to the two film gates respectively, for exposing a plurality of films to a field including a foreground part and a background part, shutter means for passing light to one gate during an exposure interval alternating with intervals during which both gates are occulted, and to the other gate during one of several parts of said exposure intervals; means for driving said shutter means; light intensity modifying apparatus for changing the illumination of one of said parts of the field; and means for controlling said light modifying apparatus in synchronism with said shutter driving means to effect said illumination change during one of said parts of the exposure interval.

47. Apparatus according to claim 46 wherein said light modifying apparatus includes a high intensity flash lamp synchronized with said shutter means to increase the illumination of one of said parts of the field during one of said parts of the interval.

48. Apparatus according to claim 46 wherein said light modifying apparatus includes an aperture admitting a substantially uniform light flux, a reflector arranged to direct said flux toward said background part, and shutter means in said aperture for opening it during one of said parts of said interval.

49. In the art of making a composite picture from separate exposures of foreground and background scenes by means of a mask having an outline corresponding to that of the foreground portion of the picture, a camera comprising two film gates, a main optical axis, a light divider in said axis to divide the light into two branches leading to the two film gates respectively, for exposing a plurality of films, and shutter means for passing light to one gate during exposure intervals alternating with occulting intervals and to the other gate during one of several parts of each one of said exposure intervals, while occulting both gates during said occulting intervals.

50. Camera according to claim 49, wherein said shutter means comprises occulting bodies in said main axis in front of said light divider and in one of said branches, respectively.

51. Camera according to claim 49 wherein said shutter means comprises a rotary disk in said main axis having an aperture sector providing said exposure interval, and an auxiliary rotary disk in one of said branches having a shuttering sector which is smaller than and effectively placed within said aperture sector.

52. Camera according to claim 49 wherein said shutter means comprises a rotary disk in said main axis having an aperture sector providing said exposure interval, and an auxiliary rotary disk in one of said branches having two shutter sectors which are together smaller than and effectively placed within said aperture sector.

53. Camera according to claim 49 wherein said shutter means comprises an occulting body in each of said branches.

54. In the art of making a composite picture from separate exposures of foreground and background scenes by means of a mask having an outline corresponding to that of the foreground portion of the picture, a motion picture taking system comprising a backing; a camera having two film gates, a main optical axis, a light divider in said axis to divide the light into two branches leading to the two film gates respectively, for exposing a plurality of films to a field including a foreground part and said backing as background part, shutter means for passing light to one gate during recurrent exposure intervals and to the other gate during one of several parts of said intervals while occulting the films simultaneously during transport intervals alternating with said exposure intervals; apparatus for projecting said background scene on said backing; means for changing the illumination of one of said parts of the field during one of said parts of the exposure intervals; and means for occulting the projecting apparatus during said exposure intervals, so that the background scene is projected on the backing only during the transport intervals undisturbed by said change of illumination, and the films are exposed to the backing illuminated by uniformly distributed light without scene projected thereon.

55. In the art of making a composite picture from separate exposures of foreground and background scenes by means of a mask having an outline corresponding to that of the foreground portion of the picture, a motion picture taking system comprising a camera having a view finder, two film gates, a main optical axis, a light divider in said axis to divide the light into two branches leading to the two film gates respectively, for exposing a plurality of films to a field including a foreground part and a background part, shutter means for passing light to one gate during recurrent exposure intervals and to the other gate during one of several parts of said intervals, while occulting the films simultaneously during transport intervals alternating with said exposure intervals; means for changing the illumination of one of said parts of the field during one of said parts of the exposure intervals; and means for occulting the view finder during the parts of changed illumination, so that the view finder admits illumination of substantially uniform level within a complete period of exposure and transport intervals.

56. In the art of making a composite picture from separate exposures of foreground and background scenes by means of a mask having an outline corresponding to that of the foreground portion of the picture, a motion picture taking system comprising a backing, a camera having a view finder, two film gates, a main optical axis, a light divider in said axis to divide the light into two branches leading to the two film gates respectively, for exposing a plurality of films to a field including a foreground part and said backing as background part, shutter means for passing light to one gate during recurrent exposure intervals and to the other gate during one of several parts of said intervals while occulting the films simultaneously during transport intervals alternating with said exposure intervals; apparatus for projecting said background scene on said backing; means for changing the illumination of one of said parts of the field during one of said parts of the exposure intervals; and means for occulting the view finder during the parts of changed illumination and the projecting apparatus during the exposure intervals.

FRANK GEORGE GUNN.

REFERENCES CITED

The following references are of record in the file of this patent:

UNITED STATES PATENTS

| Number | Name | Date |
|---|---|---|
| 1,982,211 | Gillette | Nov. 27, 1934 |
| 2,008,938 | Tolhurst | July 23, 1935 |
| 2,043,522 | Valentin et al. | June 9, 1936 |
| 2,164,770 | Gregory | July 4, 1939 |
| 2,297,582 | Rackett | Sept. 29, 1942 |
| 2,337,327 | Haskin | Dec. 21, 1943 |

FOREIGN PATENTS

| Number | Country | Date |
|---|---|---|
| 553,197 | Great Britain | May 12, 1943 |